Jan. 4, 1966    W. L. McGRATH    3,227,371
SELF-CONTROLLED AIR CONDITIONING OUTLET
Filed Sept. 17, 1962
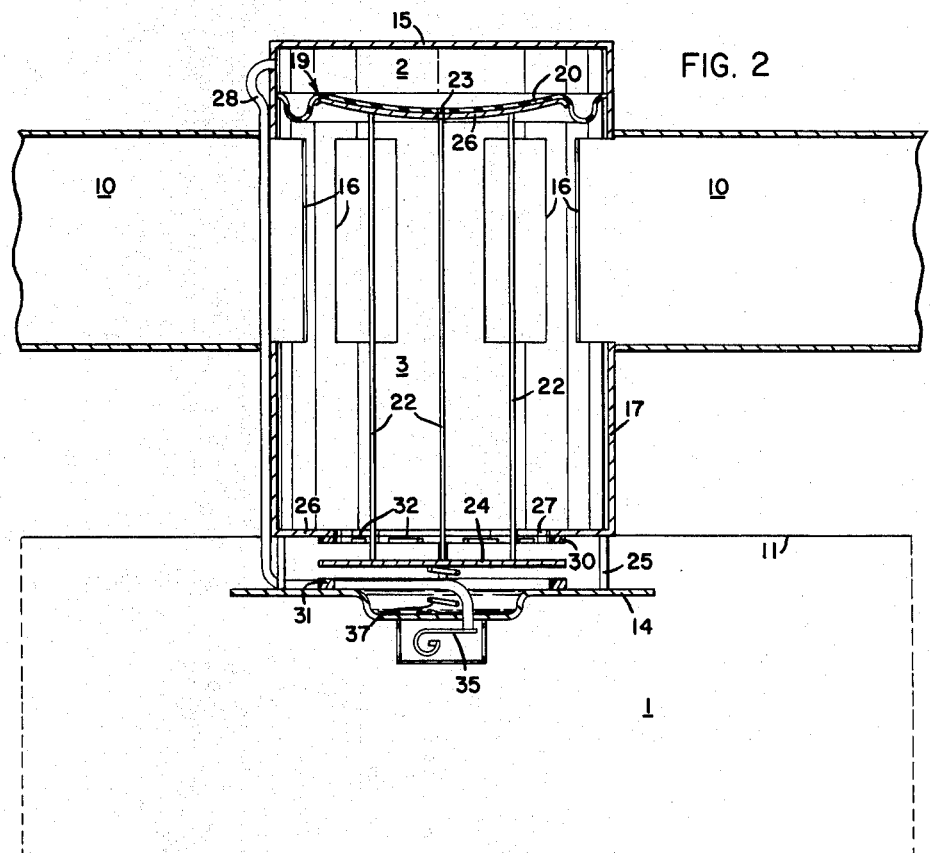
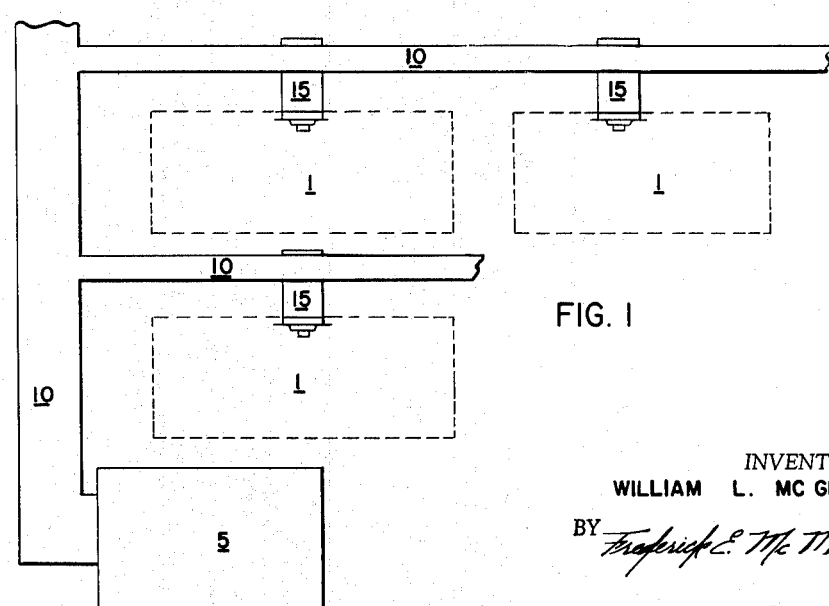
INVENTOR.
WILLIAM L. MC GRATH.
BY
ATTORNEY.

United States Patent Office 3,227,371
Patented Jan. 4, 1966

3,227,371
SELF-CONTROLLED AIR CONDITIONING OUTLET
William L. McGrath, Syracuse, N.Y., assignor to Carrier Corporation, Syracuse, N.Y., a corporation of Delaware
Filed Sept. 17, 1962, Ser. No. 223,969
7 Claims. (Cl. 236—80)

This invention relates to a structure for distributing conditioned air to areas having different and varying thermal loads.

In the art of air conditioning, the refrigerating and air conditioning apparatus may be located at a point remote from the area to be conditioned. Fresh air or a mixture of fresh and return air is there conditioned and then distributed by means of suitable duct work to the various outlets where it is introduced into the enclosure or enclosures being conditioned.

It is understood that the thermal load of each of several enclosures may vary from enclosure to enclosure. Such variation may be due to the different size and location of the several enclosures, the number of people occupying the enclosure, the machinery therein, etc. Compensation for the varying thermal loads of the individual enclosures may be made by controlling the amount of conditioned air distributed at each individual outlet in response to changes in the thermal load of the individual enclosure.

It is therefore a principal object of this invention to provide an improved means for controlling the introduction of conditioned air into an enclosure.

It is an additional object of this invention to provide a self-controlled outlet for use with air conditioning systems which will compensate for changes in thermal load of the enclosure served.

A further object of the invention is to provide improved means for individually controlling the distribution of conditioned air from a central source to an area in response to the demand of the area.

It is an additional object of this invention to provide a simple and inexpensive air outlet designed to distribute conditioned air to an enclosure so that desired temperature conditions may be maintained in the enclosure.

This invention relates to a structure for controlling the distribution of conditioned air to an enclosure including an outlet adapted to communicate a source of conditioned air with the enclosure, the outlet including a member adapted to regulate passage of conditioned air through the outlet, moving means for the member including a chamber in communication with the interior of the outlet, a flexible member forming a wall of the chamber operatively connected to the moving member, and control means for varying the pressure in the chamber in response to predetermined conditions in the enclosure so that the regulating member is moved to regulate passage of conditioned air through the outlet into the enclosure.

The attached drawings illustrate a preferred embodiment of the present invention, in which:

FIGURE 1 is a schematic view of an air conditioning system; and

FIGURE 2 is a schematic view of applicant's outlet positioned in combination with a duct system.

Referring to the drawings, a duct 10 is shown which comprises an integral part of a system of duct work serving to distribute conditioned air from any suitable source, for example, central station 5, to the various enclosure areas, for example, rooms 1 of a structure. Duct 10 may be of any desired material and is of a desired size.

The duct 10 is provided with one or more outlets 15. The number of outlets is dependent upon several factors including the number, the size and the thermal load of the enclosures served by the duct 10. It is understood that a single enclosure may have more than one outlet.

The duct 10 preferably is positioned within ceiling 11 by suitable means (not shown).

The outlet 15 comprises a casing 17 having an inward flange 26 terminating the lower portion thereof. A cover 14 is secured to the lower portion of casing 17 by means of a plurality of spaced pins 25. Cover 14 and pins 25, which extend into the area to be conditioned, may have a suitable decorative finish. A diaphragm assembly 19 including a flexible diaphragm 20 having a pressure plate 26 attached to the lower surface thereof separates the casing into an upper or diaphragm chamber 2 and a lower chamber 3. The diaphragm assembly 19 is suitably attached to the inner surface of casing 17. An orifice 23 in diaphragm assembly 19 communicates chamber 2 with chamber 3.

Lower chamber 3 communicates with the duct 10 by means of openings 16 in the outlet casing 17. As may be understood, where the outlet is positioned within the duct, openings 16 are provided in opposite sides of the casing 17 to permit the free flow of conditioned air through duct 10 irrespective of whether or not outlet 15 is open or closed. When outlet 15 is open, a portion of the conditioned air flowing through duct 10 is directed by the outlet 15 into the enclosure 1, the remaining portion continuing through the duct 10 for distribution to the other outlets. Where the outlet is positioned without the duct, openings 16 may be provided in one side only of casing 17. As may be appreciated, a suitable secondary duct communicating the duct 10 with the outlet 15 may be provided.

Inward flange 26 defines an opening 27 communicating the lower chamber 3 with the enclosure 1. A plurality of supports 22 are fixedly attached to the lower surface of pressure plate 26. Supports 22 extend through lower chamber 3 into opening 27. A closure plate 24 is fixedly attached to the lower end of supports 22. Supports 22 may slidingly abut the sides of opening 27 to prevent lateral movement of closure plate 24. Spring 37 biases closure plate 24 in a closing (upward) direction.

A ring 30 having a plurality of recesses 32 in the lower surface thereof is attached to the lower surface of flange 26. In a manner to be more fully explained herein, closure plate 24 is adapted to cooperate with ring 30 to control communication between lower chamber 3 and the enclosure 1. A lower ring 31 is attached to the upper surface of cover 14. Lower ring 31 serves as a stop to limit movement of closure plate 24 in an opening direction.

The upper or diaphragm chamber 2 is provided with a bleed tube 28. The opposite end of the bleed tube 28 terminates within the enclosure 1. Where a completely self-contained outlet is desired, the opposite end of the bleed tube 28 may be attached to the lower surface of cover 14 as shown in FIGURE 2. Alternately, the opposite end of the bleed tube 28 may be located in any part of the enclosure, for example, on the wall. A suitable thermostatic element 35 responsive to enclosure temperature is positioned adjacent the open end of the bleed tube 28. In a manner to be more fully explained, the thermostatic responsive element 35 is adapted to close the end of the bleed tube 28 in response to a predetermined change in temperature of the enclosure 1. As may be understood, a means other than enclosure temperature responsive element 35 for controlling the bleed tube 28 opening may be contemplated. For example, a control responsive to humidity conditions within the enclosure, or a control responsive to either duct pressure or duct discharge velocity, or a manual control, may be envisioned.

In operation, conditioned air from a suitable source, for example, central station 5, flowing through duct 10 passes through the upper portion of lower chamber 3 via openings 16.

Assuming that the temperature of the enclosure 1 is such that the thermostatic responsive element 35 closes off the end of bleed tube 28, pressure in upper or diaphragm chamber 2 and bleed tube 28 will equalize with that of lower chamber 3. Pressure equalization takes place due to the communication between the upper or diaphragm chamber 2 and the lower chamber 3 through orifice 23. Since pressure in lower chamber 3 is necessarily greater than pressure in the enclosure 1, closure plate 24 moves downwardly against the bias of spring 37 to communicate the lower chamber 3 with the enclosure 1. This position represents the maximum flow condition for outlet 15. Conditioned air accordingly flows into the enclosure 1.

Assuming a change in enclosure temperature, thermostatic responsive element 35 opens the end of bleed tube 28. As bleed tube 28 opens, the pressure in the bleed tube 28 and the upper or diaphragm chamber 2 is reduced by the bleed of air into the enclosure 1.

It is noted that the area of bleed tube 28 is greater than that of orifice 23. Accordingly, the rate of supply of air at duct pressure from lower chamber 3 into upper or diaphragm chamber 2 by means of orifice 23 may be exceeded by the rate of discharge of upper or diaphragm chamber 2 into enclosure 1 through bleed tube 28.

As the pressure in upper or diaphragm chamber 2 decreases, diaphragm assembly 19 moves closure plate 24 toward ring 30 thereby reducing the size of opening 27 and accordingly reducing the amount of conditioned air supplied to enclosure 1. Continued pressure drop in the upper or diaphragm chamber 2 reflecting a continued change in room temperature results in the diaphragm assembly 19 moving closure plate 24 into contact with ring 30 so that communication between lower chamber 3 and enclosure 1 is restricted to recesses 32. This position represents the minimum flow condition for the outlet 15.

Applicant's unique self-controlled outlet provides independent control of the amount of conditioned air delivered by each outlet to each enclosure in response to the particular requirements of each enclosure. Where more than one self-controlled outlet is provided for an individual enclosure, it is appreciated that each outlet may include an individual thermostatic responsive element. Alternately a common thermostatic responsive element for the several outlets may be provided. Further, in the case of plural outlets for a single enclosure, each having an individual thermostatic responsive control therefor, it is understood that the temperature response of the individual thermostatic responsive controls may be different.

While I have described and illustrated a preferred embodiment of my invention, it will be understood that my invention is not limited thereto since it may be otherwise embodied within the scope of the following claims.

I claim:

1. In an outlet for an air conditioning system, the combination of: means adapted to communicate with a source of supply of conditioned air, said means including an opening therein adapted to communicate with the area to be treated, a first member to regulate passage of conditioned air through said opening into the area being treated, an actuating mechanism for said first member, said mechanism including a chamber, a movable member forming a wall of said chamber having an orifice therethrough to communicate the interior of said chamber with the interior of said means to provide desired air pressure in the interior of said chamber, control means for varying the pressure in said chamber including a passage adapted to communicate the interior of said chamber with the area to be treated, and means connecting said movable member with said first member to communicate movement of said movable member to said first member whereby said first member is moved toward or from the opening to regulate passage of conditioned air into the area being treated.

2. An apparatus as recited in claim 1, said control means including a second member adapted to regulate passage of conditioned air through said passage in response to predetermined conditions in the area being treated.

3. An apparatus as recited in claim 1 wherein said control means is responsive to predetermined conditions in the area being treated.

4. In an air conditioning system having a source of conditioned air, the combination of: a first passage adapted to communicate said source of conditioned air with an area to be treated, a first regulating member in said first passage adapted to regulate passage of conditioned air therethrough, an actuating mechanism in said first passage including a chamber having an expansible member forming a wall thereof, means operatively connecting said first regulating member with said expansible member, a second passage communicating said chamber with said source of conditioned air, a third passage adapted to communicate said chamber with the area to be treated, and control means for said actuating mechanism including a second regualting member adapted to regulate passage of conditioned air through said third passage in response to changes in room temperatures, said actuating means moving said regulating member to regulate passage of conditioned air into the area being treated.

5. An apparatus for controlling delivery of conditioned air to an enclosure comprising: a first passage communicating said enclosure with said source of conditioned air, means adapted to regulate passage of conditioned air through said first passage means, pressure responsive drive means for said regulating means, control means for said pressure responsive drive means including a second passage communicating said source of conditioned air with said pressure responsive drive means to provide a first pressure, said pressure responsive drive means placing said regulating means in a first regulating position in response to said first pressure, a third passage adapted to communicate said enclosure with said pressure responsive drive means to provide a second pressure, and means communicating said third passage with said enclosure in response to a predetermined change in enclosure temperature, said pressure responsive drive means placing said regulating means in a second regulating position in response to said second pressure.

6. Apparatus for conditioning an area comprising: a source of conditioned air, a distributing duct therefor, an outlet adapted to communicate said duct with said area, said outlet including a regulating member adapted to regulate passage of conditioned air through said outlet, control means for moving said regulating member including an expansible member operatively connected thereto, a first side of said expansible member communicating with said duct, a first passage communicating a second side of said expansible member with said duct so that said regulating member provides unrestricted passage of conditioned air through said outlet, a second passage adapted to communicate the second side of said expansible member with said area, and temperature responsive means adapted to regulate communication of said second passage with said area in response to changes in area temperature whereby said regulating member restricts passage of conditioned air through said outlet.

7. In an air conditioning system having a source of supply of conditioned air, the combination of: an outlet, an expansible member separating said outlet into a first chamber having an opening therein for communicating said first chamber with the area to be conditioned and a second chamber, means communicating said outlet first chamber with said supply of conditioned air for discharge through said first chamber opening into the area to be conditioned, a valve for regulating discharge of conditioned air through said first chamber opening, means connecting said regulating valve to said expansible member, said expansible member including an orifice communicating said first chamber with said second chamber, a bleed passage between said second chamber and the area to be conditioned, and control valve means for regulating bleed of air through said passage in response to temperature conditions in the area being conditioned, said control valve means increasing the bleed of air from said second chamber through said passage in response to a predetermined change in temperature in the area being conditioned whereby said expansible member moves said regulating valve in a closing direction to decrease the flow of conditioned air into the area being conditioned.

References Cited by the Examiner

UNITED STATES PATENTS

| | | | |
|---|---|---|---|
| 2,241,108 | 5/1941 | Akers | 236—49 |
| 2,308,165 | 1/1943 | Fields | 236—12 |
| 2,821,343 | 1/1958 | Payne | 236—13 |
| 2,997,240 | 8/1961 | Kruettner | 236—13 |
| 3,028,096 | 4/1962 | Beggs | 236—80 |
| 3,058,664 | 10/1962 | Donahue | 236—80 |
| 3,082,676 | 3/1963 | Church et al. | |

FOREIGN PATENTS

| | | |
|---|---|---|
| 253,317 | 6/1926 | Great Britain. |
| 767,980 | 2/1957 | Great Britain. |

ALDEN D. STEWART, *Primary Examiner.*

EDWARD J. MICHAEL, WILLIAM F. O'DEA,
*Assistant Examiners.*